May 16, 1933.  J. D. KEITH  1,909,362
COMBINATION REAR VIEW MIRROR AND MEMORANDUM DEVICE
Filed June 29, 1931   2 Sheets-Sheet 1
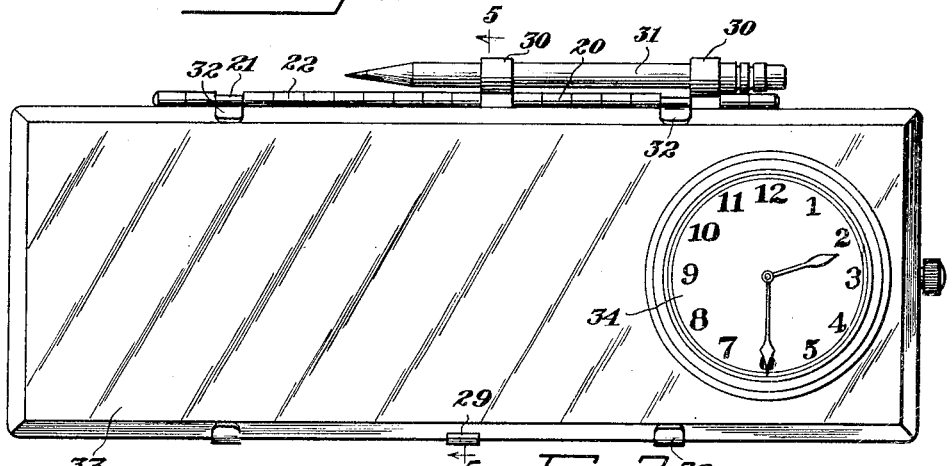
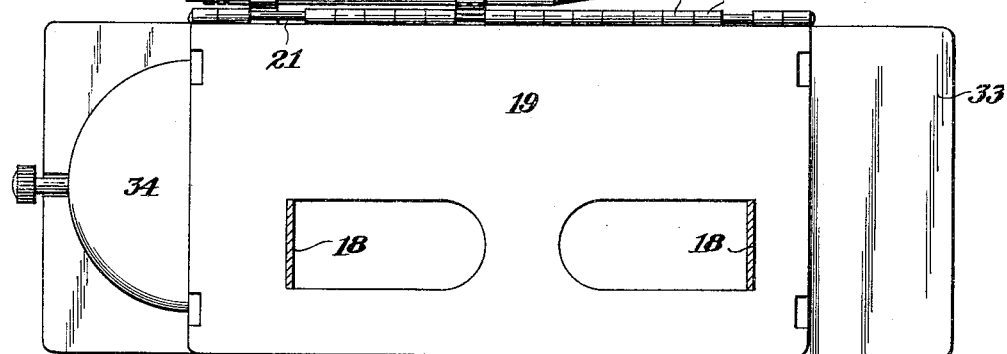
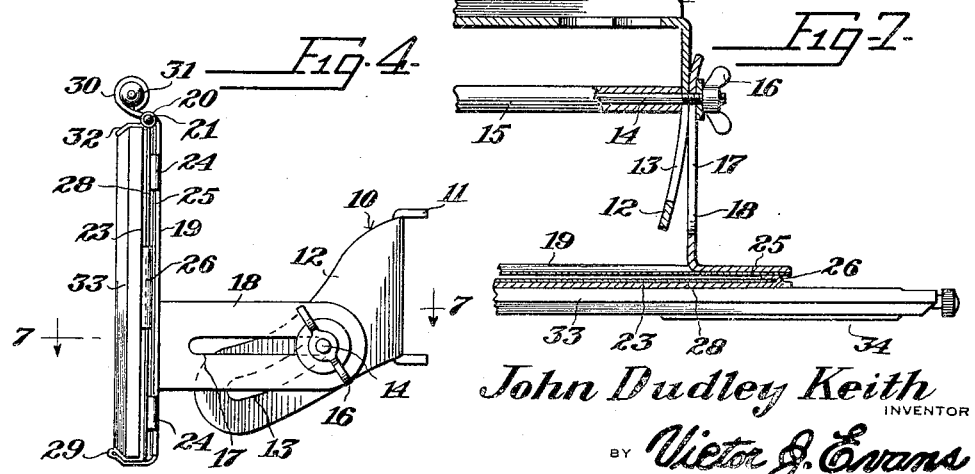
John Dudley Keith
INVENTOR
BY Victor J. Evans and Co.
ATTORNEY May 16, 1933.  J. D. KEITH  1,909,362
COMBINATION REAR VIEW MIRROR AND MEMORANDUM DEVICE
Filed June 29, 1931  2 Sheets-Sheet 2
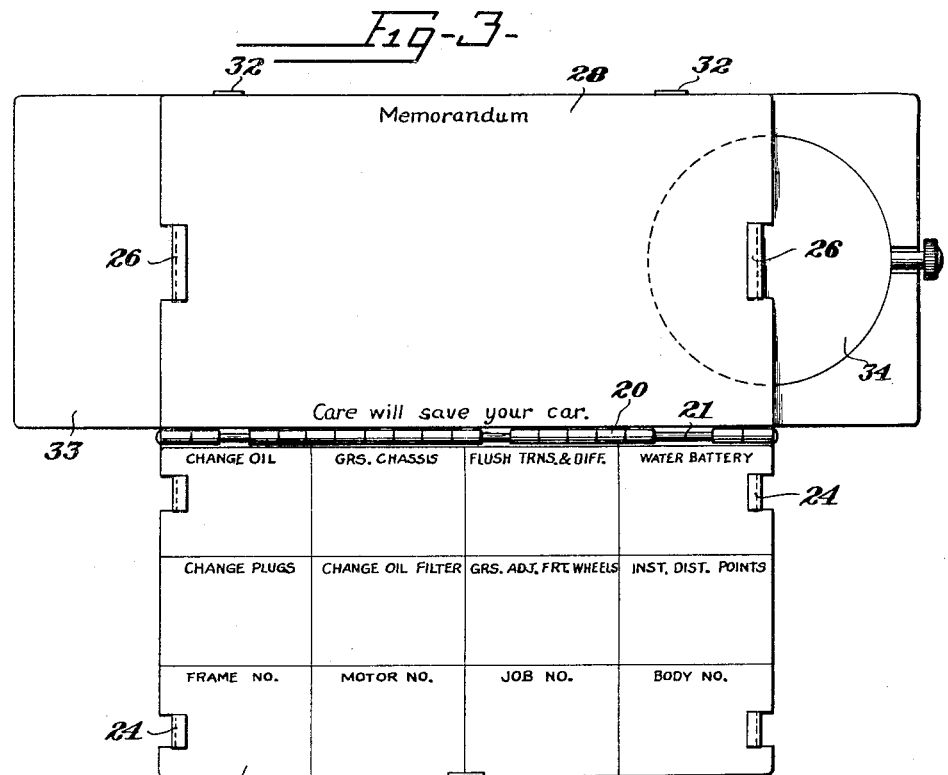
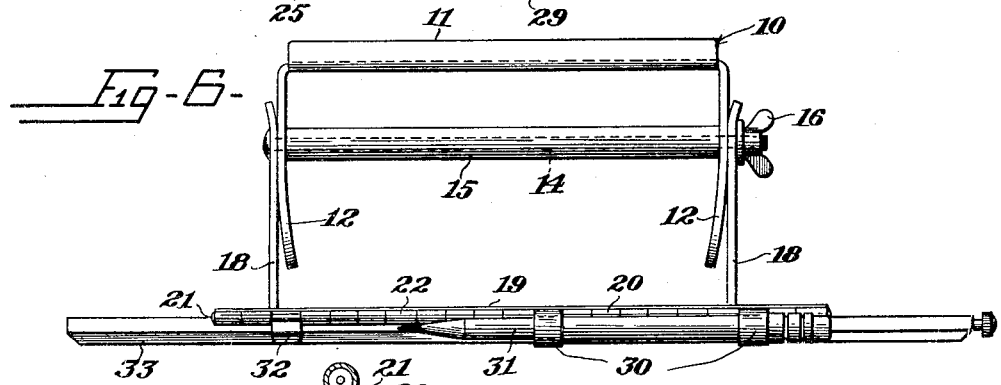
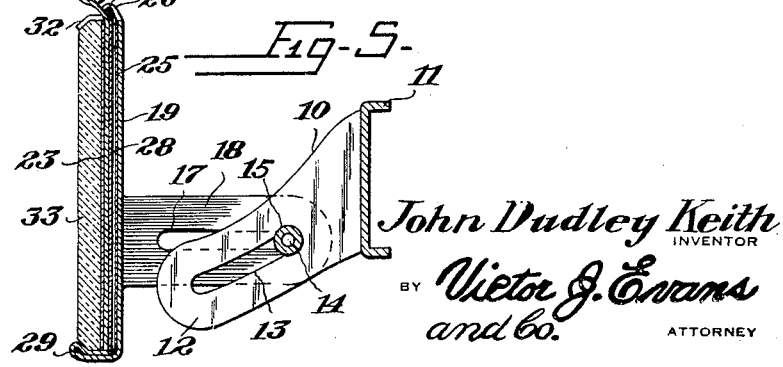

Patented May 16, 1933

1,909,362

UNITED STATES PATENT OFFICE

JOHN DUDLEY KEITH, OF MAYSVILLE, KENTUCKY

COMBINATION REAR VIEW MIRROR AND MEMORANDUM DEVICE

Application filed June 29, 1931. Serial No. 547,739.

The invention relates to a rear view mirror, and more especially to a combination rear view mirror and memorandum device for use in motor vehicles.

The primary object of the invention is the provision of a device of this character wherein there is provided a rear view mirror so that motor vehicles or other traffic following can be made visible by the operator of the automobile equipped with said mirror either by day or night and such mirror carries a time piece, while the backing for the mirror and the support therefor is arranged to carry memorandum sheets and a notation card, the memorandum sheets being available for memorandums, while the notation card is available for making notations of certain conditions or equipment of the car or automobile, for example, the date when the motor oil was changed, the date when water was last placed in the battery and other information requisite in determining the condition of said car or automobile, as well as a holder for a writing instrument such as a pencil, thus rendering the device useful for the purpose stated.

Another object of the invention is the provision of a device of this character wherein the mirror is adjustably supported so that it can be regulated to be highly efficient for reflective purposes by day or night and additionally in the arrangement of the device it serves for recording memorandums, notations, etc., which data makes available at a glance certain conditions incident to the usage of the automobile or the like, the device being novel in form and highly useful as a part of the equipment of the automobile or the like.

A further object of the invention is the provision of a device of this character wherein the support is of novel form for accommodating a notation chart and memorandum pad readily available with dispatch and carries the rear view mirror so that the same is adapted to give the maximum of desirable results in both day and night driving, the support being adjustable for the position of such mirror according to the desires of the operator of the automobile when mounted therein.

A still further object of the invention is the provision of a device of this character which is extremely simple in construction, neat and attractive in appearance, highly serviceable, thoroughly reliable and efficient in its purpose, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a front elevation of the device constructed in accordance with the invention.

Figure 2 is a rear elevation thereof.

Figure 3 is a front elevation showing the mirror raised for exposing the memorandum pad and notation chart.

Figure 4 is a side elevation.

Figure 5 is a sectional view on the line 5—5 of Figure 1.

Figure 6 is a top plan view.

Figure 7 is a fragmentary sectional view on the line 7—7 of Figure 4.

Similar reference characters indicate corresponding parts throughout the several views in the drawings.

Referring to the drawings in detail, 10 designates a bracket comprising the intermediate channeled portion 11 which is designed to accommodate itself to the framing of the upper portion of a windshield of an automobile or the like and is detachably made fast thereto in any suitable manner, while bent outwardly at right angles from this portion are elongated slightly inwardly curved ears 12, these being provided with slots 13 for accommodating a binding bolt 14 which is passed through the slots 13 and carries therebetween a sleeve 15, the bolt at one end being headed and at the opposite end carrying a winged nut 16. This bolt 14 also passes through slots 17 provided in ears 18 cut from and bent at right angles to a backing plate 19, the latter being preferably of rectangular shape.

The backing plate 19 at its upper longer edge is formed with pintle sleeves 20 receiving a pintle or pivot pin 21, the same being also engaged with pintle sleeves 22 formed on a front swinging plate 23, the latter being correspondingly shaped to the backing plate 19 and is adapted to be normally swung to overlie the same.

The backing plate 19 at opposite ends has cut and bent outwardly and inwardly therefrom retaining tongues 24, these removably holding thereon a notation chart or card 25, the same being ruled and provided with indicia for identifying certain notations, such for example as "Change oil"; "Change plugs"; "Grs. chassis"; "Water battery"; "Flush trans. and diff."; "Frame No."; "Motor No."; "Job No.", and "Body No.", etc. The front plate 23 has cut and bent therefrom retaining tongues 26, these being designed to mount upon the inner face of said plate memorandum sheets 28 for the making of memorandums at the will of the user of the device.

The backing plate 19 is formed with a spring snap latching member 29 for engaging the front plate 23 when close onto the backing plate and to sustain it latched normally.

The front plate 23 at the hinged edge thereof has provided thereon spaced eyes 30, these constituting a holder for a pencil or other writing instrument 31 which is removable for making memorandums or notations on the sheets and card hereinbefore described.

The front plate 23 at the opposite longer edges thereof is further provided with tongues 32, these engaging a rear view mirror 33 which can be readily adjusted therein as the tongues frictionally bind the same against the front plate 23 as will be apparent. The mirror 33 is of greater length than the front plate 23, and near one end therein is fitted a watch or other time piece 34 convenient for use by the user of the device.

When it is desired to make memorandums or notations on the sheets 28 and card 25 it is only necessary to free the front plate 23 from the latch 29 and raise said plate with the mirror thereon as shown in Figure 3 of the drawings and for the convenience of the user of the device the pencil 31 may be employed for the making of the memorandums or notations as should be obvious.

The bracket 10 is readily adjustable by the bolt 14 and nut 16 thereon so as to regulate the disposition of the rear view mirror to suit the fancy of the user of said device and to enable maximum efficiency thereon in daylight or night driving.

What is claimed is:

1. In a device of the kind described, a flat backing plate having connection with a bracket for the support thereof, pintle sleeves formed at one edge of the backing plate, a mirror supporting plate having pintle sleeves at one edge thereof, a pintle engaging the pintle sleeves of said plates to permit the last mentioned plate to drop onto the backing plate at will for concealing the latter, retaining tongues cut and bent from opposite ends of the backing plate to overlie the outermost face thereof, and a card having notches companions to the tongues for the detachable securing of said card upon the backing plate and also provided with ruled lines providing notation spaces, and indicia for identifying such spaces for the marking of certain data therein.

2. In a device of the kind described, a flat backing plate having connection with a bracket for the support thereof, pintle sleeves formed at one edge of the backing plate, a mirror supporting plate having pintle sleeves at one edge thereof, a pintle engaging the pintle sleeves of said plates to permit the last mentioned plate to drop onto the backing plate at will for concealing the latter, retaining tongues cut and bent from opposite ends of the backing plate to overlie the outermost face thereof, a card having notches companions to the tongues for the detachable securing of said card upon the backing plate and also provided with ruled lines providing notation spaces and indicia for identifying such spaces for the marking of certain data therein, and means for latching the plates together.

In testimony whereof I affix my signature.

JOHN DUDLEY KEITH.